April 25, 1933.  F. H. MORRIS  1,905,185
HEAT TRANSFER
Filed Sept. 2, 1927
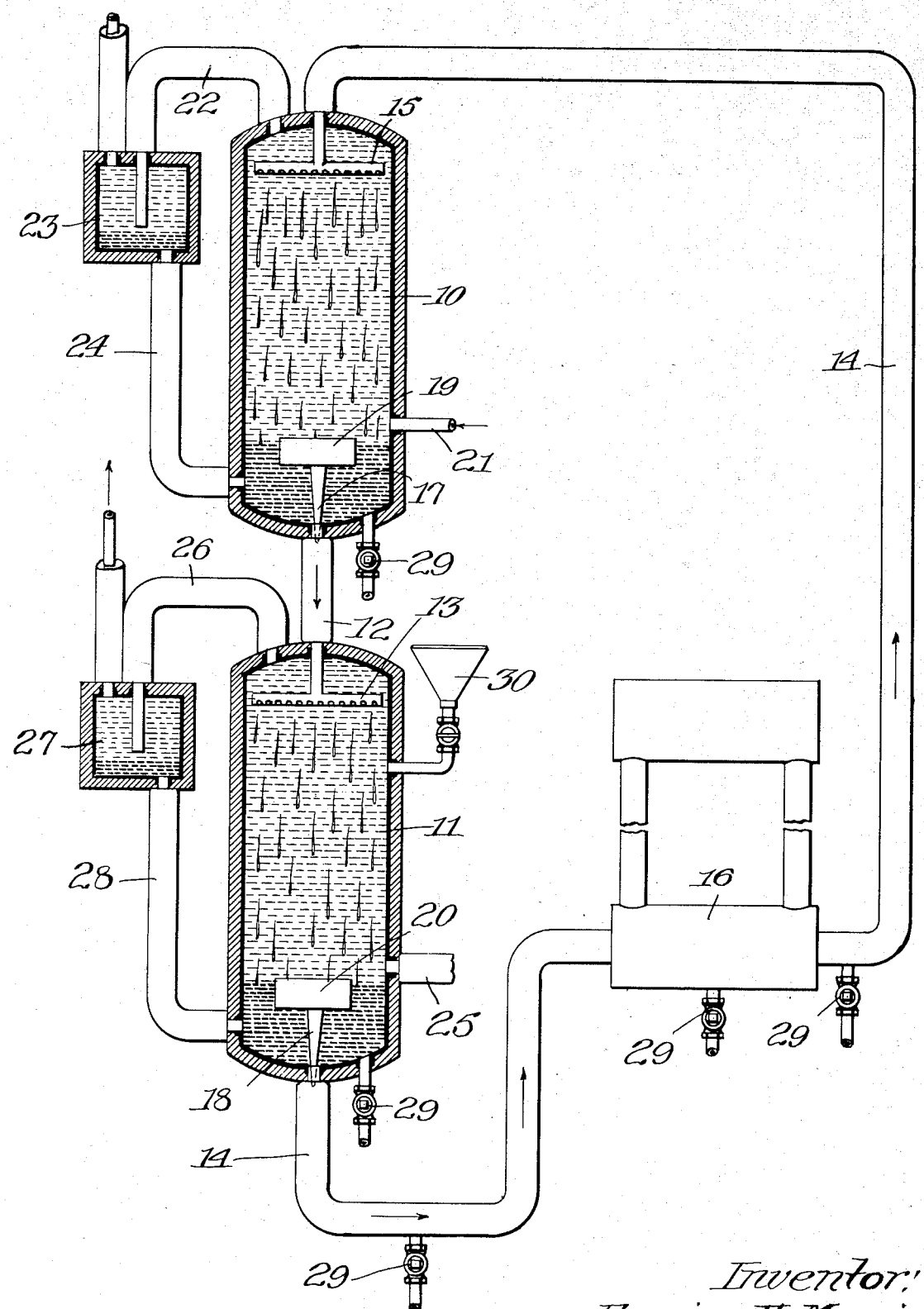
Inventor:
Fearing H. Morris,
By Dyrenforth, Lee, Chritton & Wiles,
Attys.

Patented Apr. 25, 1933

1,905,185

UNITED STATES PATENT OFFICE

FEARING H. MORRIS, OF WHITING, INDIANA, ASSIGNOR TO STANDARD OIL COMPANY, OF WHITING, INDIANA, A CORPORATION OF INDIANA

HEAT TRANSFER

Application filed September 2, 1927. Serial No. 217,135.

This invention relates to the transfer of heat to fluids and particularly from one fluid to another, and will be readily understood from the following description taken in conjunction with the accompanying drawing, in which:

The figure is a diagrammatic view, partly in section, of a heat-exchanger for transferring heat from one liquid to another.

Referring to the figure, 10 is a chamber adapted to receive liquid to be heated, for example, a petroleum oil which is about to be fed into a still or other apparatus and raised to a high temperature. The chamber 11 receives a hot liquid from which it is desired to transfer heat to the liquid in chamber 10. This hot liquid may suitably be a hot residue or tar withdrawn at high temperature from a petroleum distillation apparatus. The chamber 11 is suitably at a lower level than the chamber 10 and a pipe 12 leads from the bottom of chamber 10 into the chamber 11, terminating near the top of said chamber in a liquid distributing device 13, provided with numerous discharge openings. From the bottom of chamber 11, a pipe 14 leads into the chamber 10 terminating, near the top of said chamber, in a liquid distributing device 15. The pipe 14 is provided with a pump 16, preferably a surge pump, which is adapted to withdraw liquid from the bottom of chamber 11 and supply it to the distributing device 15.

In the operation of my invention in the form illustrated in the figure, heat is transferred by a liquid medium which is heavier than the oils in the chambers 10 and 11. Said liquid medium collects in the lower portion of the chambers to form liquid seals, preventing escape of oil by the pipes 12 and 14. Said pipes are controlled by tapering valves 17 and 18, which are provided with floats 19 and 20 of such buoyancy that they float on the surface of the heat transfer liquid but do not float in the oil. Thus when the heat transfer liquid falls below a certain level in either chamber 10 or 11, the pipe 12 or 14 is automatically closed so as to maintain a seal of heat transfer liquid at the bottom of the chambers.

Cold oil enters the chamber 10 by pipe 21, preferably located near the bottom thereof and the heated oil flows from the chamber by pipe 22, preferably located near the top thereof. The outlet pipe 22 is provided with a trap 23 for removing any entrained heat transfer fluid, and a pipe 24 is provided for returning such fluid to the base of the chamber 10. The hot oil enters the chamber 11 by pipe 25, preferably located near the bottom thereof, and flows from the chamber by pipe 26, preferably located near the top thereof. The outlet pipe 26 is provided with a trap 27 for removing any entrained heat transfer fluid, and a pipe 28 is provided for returning such fluid to the base of chamber 11.

Suitable drain valves 29 are provided in the apparatus for draining the heat transfer medium from the apparatus when discontinuing the operation, in order to prevent the apparatus from becoming choked. A hopper 30 connected to the chamber 11 by a valved connection is provided for the purpose of introducing heat transfer medium into the system. The whole apparatus is preferably lagged to prevent loss of heat therefrom. An important feature of the apparatus described is that all the joints thereof can be welded, giving a tight unitary structure.

The operation is as follows. Mercury, low melting point alloys, as well as metallic salts or compounds or mixtures thereof which are liquid at the temperatures of the oils and are non-miscible therewith, may be employed as the heat transfer fluid. For example, a mixture of potassium and sodium hydroxides melting at 356° F. may be employed in suitable cases. Suitable alloys are Newton's metal, comprising 18¾% tin, 31¼% lead and 50% bismuth, and melting at 202° F., Rose's metal comprising 25% tin, 25% lead and 50% bismuth, and melting at 201° F., and Wood's metal comprising 12½% tin, 25% lead, 12½% cadmium and 50% bismuth and melting at 141° F. Such heat transfer fluid is introduced by hopper 30 into the chamber 11, the temperature of the medium being sufficiently high to preheat the apparatus without becoming solidified. Hot oil, which may be the residue from highly heated petroleum stills is supplied by pipe 25 to the chamber 11, and passes out by pipe 26. The cold oil to be heated is supplied to the chamber 10 by pipe 21 and passes out by pipe 22. The heat transfer medium collects in the bottom of chamber 11 and is supplied by pump 16 to the distributing device 15, from which it issues in the form of small drops which fall through the oil in chamber 10, imparting heat thereto. The heat transfer medium collecting in the bottom of chamber 10 causes the valve 17 to open and the medium passes by gravity to the distributing device 13 in chamber 11, from which it issues in the form of small drops which fall through the hot oil therein, abstracting heat therefrom. The heat transfer medium collecting in the bottom of chamber 11 is thus brought to a suitable temperature for imparting heat to the oil in chamber 10 as the circulation and operation are continued. Any heat transfer medium entrained by the oil passing from the chambers 10 and 11 by pipes 22 and 26, separates out in the traps 23 and 27 and is returned to the chambers 10 and 11 by pipes 24 and 28. While this operation has been described in connection with the transfer of heat from a liquid to a liquid, the same method may equally be applied to the transfer of heat from one gas or vapor to another or from a gas or vapor to a liquid, or vice versa.

While the invention has been illustrated by the description of specific apparatus and methods, it must be understood that the invention is not intended to be limited thereto, except by the terms of the appended claims.

I claim:

1. Apparatus for transferring heat from one independent fluid body to another comprising a pair of separate closed chambers, one of said chambers being adapted to contain a body of fluid to be cooled, and the other a body of fluid to be heated, conduit means leading from the lower end of each of said chambers to the upper end of the other of said chambers, said chambers being otherwise independent and not in communication with each other, means for cyclically circulating a substantially immiscible fluid heat transfer medium from one of the chambers, through one of said conduits into and through the other of said chambers and through the other of said conduits and back into and through the first-named of said chambers, whereby heat contained by one fluid body is transferred to the other fluid body, said heat transfer medium having a specific gravity substantially different from that of the said fluid bodies, and means for maintaining a substantial body of said heat transfer fluid in one end of each of said chambers between the said bodies of fluid being heat exchanged and the point at which said fluid heat transfer medium is withdrawn into said conduits for passage through the other of the said chambers, thereby preventing the said bodies of fluid being heat exchanged from becoming admixed with each other.

2. Apparatus for transferring heat from one independent fluid body to another comprising a pair of separate closed chambers, one of said chambers being adapted to contain a body of fluid to be cooled and the other a body of fluid to be heated, conduit means leading from the lower end of each of said chambers to the upper end of the other of said chambers, said chambers being otherwise independent and not in communication with each other, means for cyclically circulating a substantially immiscible heavier fluid heat transfer medium from the lower end of one chamber through one of said conduits into the upper end of the other of said chambers and from the lower end of the latter chamber through the other of said conduits and into the upper end of the first-named of said chambers, whereby heat contained by one fluid body is transferred to the other fluid body, and means for maintaining a body of said heat-transfer medium in the lower end of each of said chambers over the point of connection of the conduit leading to the upper end of the other of the said chambers, thereby preventing the said bodies of fluid being heat exchanged from becoming admixed with each other.

In testimony whereof, I have hereunto set my hand this 16th day of August, 1927.

FEARING H. MORRIS.